Patented June 8, 1943

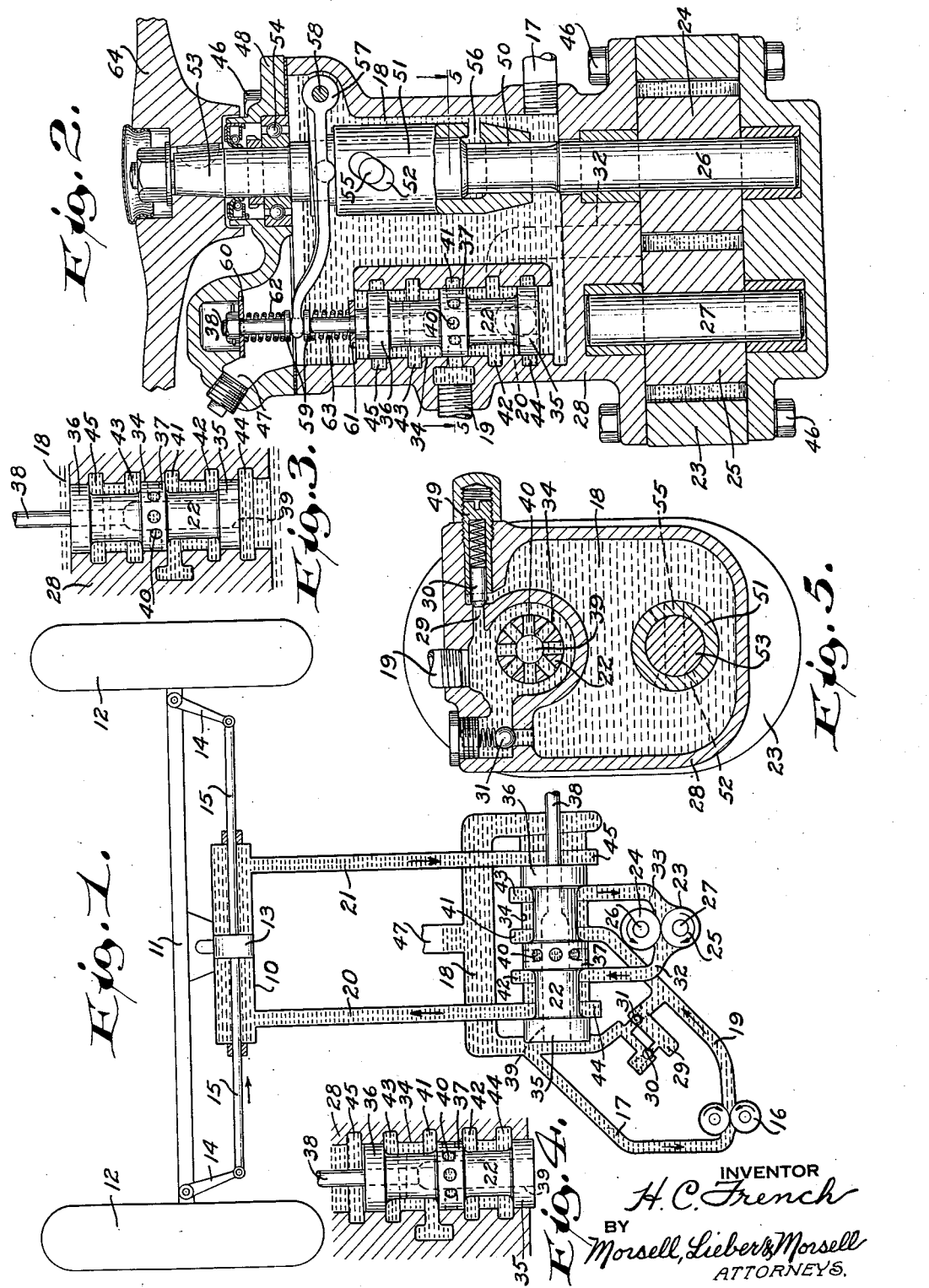

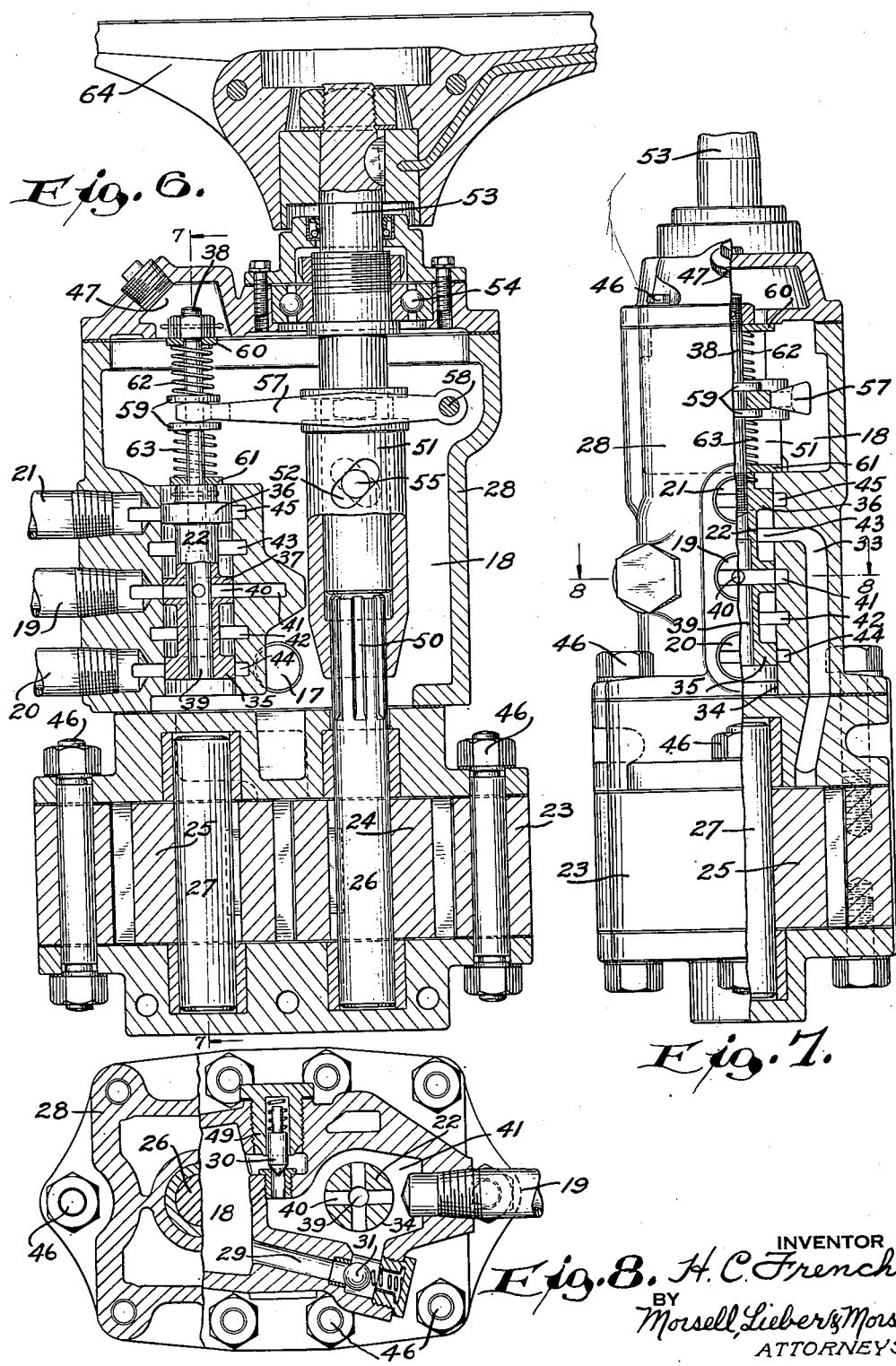

2,321,377

UNITED STATES PATENT OFFICE 2,321,377

HYDRAULIC STEERING GEAR

Henry C. French, Elm Grove, Wis., assignor to The Heil Co., Milwaukee, Wis., a corporation of Wisconsin Application August 1, 1940, Serial No. 349,039

26 Claims. (Cl. 180—79.2)

This invention relates to improvements in the art of guiding transports or vehicles of various types, and relates more specifically to improvements in the construction and operation of hydraulic steering gear for land, water and air vehicles.

An object of my invention is to provide an improved hydraulic steering system which is simple in construction and efficient in operation.

Some of the more important specific objects and advantages of the invention are as follows:

To provide an improved steering gear in which the movement of the controlled vehicle positively and quickly partakes directional advancements corresponding to the movements of the manually operated steering wheel or element.

To provide a hydraulic steering assemblage which is easily manipulable and sensitive in action; and wherein the controlled vehicle may be safely guided even if the source of power for effecting normal operation, should fail.

To provide an improved hydraulic steering system which is simple, compact and durable in construction, and which may be readily installed as a unit in vehicles of various types and especially on motor propelled vehicles.

To provide an improved steering gear which may be installed and effectively operated at moderate cost, and all parts of which are readily accessible for inspection, adjustment and other attention.

To provide a new and useful power actuated steering assemblage which is safely operable by a novice, and wherein failure of the source of power will not preclude operation and functioning of the steering gear.

To provide an improved hydraulic steering system which can be readily refilled so as to avoid entrapment of air, and wherein the fresh oil supply is so disposed that all spaces will be maintained oil-filled and undesirable leakage will be eliminated.

To provide an effective power operated hydraulic steering gear especially applicable to motor driven vehicles, and wherein power driven and manually operable pumps are caused to cooperate so as to insure most efficient steering at all times.

A clear conception of several embodiments of the invention, and of the mode of constructing and of operating hydraulic steering systems built in accordance with the improvement, may be had by referring to the drawings accompanying and forming a part of this specification wherein like reference characters designate the same or similar parts in the various views.

Fig. 1 is a diagram showing one of my improved hydraulic steering systems applied to the steering wheels of a vehicle;

Fig. 2 is a central vertical section through the manually operable control and actuating mechanism comprising part of the system of Fig. 1, showing the control valve in mid or neutral position;

Fig. 3 is a similar section through the control valve of Fig. 2 alone, showing the same in maximum elevated position;

Fig. 4 is another similar section through the control valve of Figs. 2 and 3, showing the valve in lowermost position;

Fig. 5 is a transverse section through the assembly of Fig. 2, taken along the line 5—5;

Fig. 6 is a central vertical section through a more refined commercial embodiment of the manually operable actuating and control mechanism, showing the control valve in neutral position;

Fig. 7 is another partial vertical section through the assemblage of Fig. 6 taken through the control valve along the line 7—7, and at right angles to the plane of section of Fig. 6; and Fig. 8 is an irregular transverse section through the mechanism of Figs. 6 and 7, taken partially along the line 8—8 of Fig. 7.

While the invention has been shown herein as being specifically embodied in a hydraulic steering gear system especially applicable to a motor propelled ground vehicle, it is not my desire or intent to thereby unnecessarily restrict the scope or utility of the improvement or its field of application. The term "motor" as used herein is intended to cover any conventional type of servo-motor whether of the rotary, reciprocating or oscillatory type.

Referring to the drawings, and especially to the diagram of Fig. 1, the improved power actuated hydraulic steering system shown therein comprises in general a main cylinder 10 suitably mounted for movement upon the vehicle axle 11 between the steering transporting wheels 12 and having therein a piston 13 connected to the wheel swinging levers 14 by means of piston rods 15; a main pump 16 operable from the propelling motor of the vehicle and having a suction or inlet conduit 17 communicable with a liquid or oil supply reservoir 18, and a discharge conduit 19 communicable with either of the cylinder inlet and discharge conduits 20, 21 past a control valve 22; and a manually operable gear pump 23 communicable with the pump discharge conduit 19 and with the conduits 20, 21 through the valve 22.

Both of the pumps 16, 23 may be of the intermeshing gear type, and the intermeshing toothed rotors 24, 25 of the manually operable pump 23 are secured to shafts 26, 27 respectively which are journalled for rotation in a main casing 28 in which the supply reservoir 18 and the control valve 22 are confined. The inlet and discharge conduits 17, 19 of the main pump 16 are connected by a passage 29 having an adjustable pressure relief valve 30, and a non-return check valve 31 therein, and the other pump 23 is reversible in action and has inlet and discharge conduits 32, 33 communicating with the control valve bore 34 and adapted to be interchangeably connected to the main pump discharge conduit 19 and with the conduits 20, 21.

The control valve 22 is slidable in the bore 34 and has opposite end pistons 35, 36 and an intervening piston 37 snugly cooperable with the bore 34. The valve 22 has an actuating stem 38 at one end, and an interval bore 39 in open communication at one end with the supply reservoir 18 and communicating at its opposite end with radial passages 40 formed in the medial piston 37. The main pump discharge conduit 19 communicates with a central valve port 41 with which the passages 40 and bore 39 are in open communication when the valve 22 is in central or neutral position as in Fig. 2; and when the pump 16 is operating with the control valve 22 in this neutral position, the liquid is merely being circulated from the supply reservoir 18 through the conduit 17, pump 16, conduit 19, port 41, passages 40, and bore 39 back to the reservoir 18. The valve bore 34 is also provided with annular ports 42, 43 spaced equidistant from the central port 41, and communicating with the conduits 32, 33 respectively; and also has opposite end ports 44, 45 communicating with the conduits 20, 21 respectively. The valve ports 42, 43 are adapted to be interchangeably and alternately connected either to the central port 41 or to the end ports 44, 45, so as to admit liquid under pressure from the main pump 16 through the manually operable pump 23 to either displacement chamber of the cylinder 10, while at the same time exhausting liquid from the other displacement chamber to the reservoir 18 through one of the end ports 44, 45.

The main casing 28 may be formed of several sections detachably interconnected by means of cap screws and bolts 46, and the reservoir 18 is provided at its highest portion with a filling opening 47 which is normally closed by a removable plug, see Fig. 2. The conduits 17, 19, 20, 21 which communicate with the casing 28, may be flexible so as to permit relative movement of the interconnected parts, and the pump 23 and control valve assemblage, are housed within the casing 28 thus providing a unitary reservoir, pump and valve assembly. The casing 28 is also provided with a removable cap or cover 48, and by virtue of the sectional construction of the casing, all of the enclosed pump and valve parts are readily accessible for inspection and may be readily assembled and dismantled. The relief valve 30 is also housed within the casing 28 as shown in Fig. 5, and is adjustable by means of a screw plug 49, and both of the valves 30, 31 are accessible from the casing exterior and are normally held to their seats by springs as shown.

The rotors 24, 25 of the manually operable pump 23 are snugly fitted within the casing 28 and accurately coact with each other so as to prevent free passage of liquid through this pump, and the upper end of the rotor shaft 26 is provided with splines 50 which have sliding coaction with the lower portion of a sleeve 51 the upper portion of which is bored and has one or more inclined slots 52 therein. The steering wheel shaft or column 53 is journalled for rotation in an antifriction bearing 54 carried by the casing cover section 48, in axial alinement with the pump rotor shaft 26, and the column 53 has snug coaction with the upper bore of the sleeve 51 and is provided with integral pins 55 extending radially therefrom and coacting with the sleeve slots 52. The sleeve 51 may also be provided with an opening 56 for permitting free access of liquid such as oil from the reservoir 18 to the sleeve interior, and the upper end of the sleeve 51 coacts with the medial portion of a control valve actuating lever 57, see Fig. 2. One end of the lever 57 is fulcrumed upon the casing 28 by means of a pivot pin 58, and the opposite swinging end thereof coacts with collars 59 secured to the valve stem 38, and the upper and lower collars 59 coact respectively with fixed upper and lower reaction plates 60, 61 through helical compression springs 62, 63. The upper extremity of the steering column 53 beyond the bearing 54, is provided with a removable steering element or wheel 64 which is normally located within easy reach of the vehicle driver's seat.

While the invention has been illustrated in rather schematic or diagrammatic form in Figs. 1 to 5 inclusive, a more complete commercial embodiment of the control mechanism has been depicted in Figs. 6 to 8 inclusive. While the various parts of the commercial embodiment are more refined in structure, the general construction and operation of the various parts is the same as that of the diagrammatic embodiment. In the modified refined assemblage, the main casing 28 comprises more sections than in the embodiment of Figs. 2 and 5, in order to facilitate manufacture of the parts and to enhance the ease of assembling and dismantling. The capacity of the supply reservoir 18 has also been increased, and the strength of various parts has been augmented, while the design of the parts has been simplified. The functioning of both embodiments is however identical, so that a description of the operation of the diagrammatic disclosure will apply directly to all embodiments disclosed. In fact, the primary reason for showing the more refined commercial embodiment, is that this assemblage has gone into successful use and has proven highly satisfactory especially in connection with motor propelled land vehicles.

During normal operation of the improved steering system, the reservoir 18 and the pumps, cylinders and passages or conduits, should first be supplied with an abundance of liquid such as oil, and air pockets should be eliminated. When the steering transporting wheels are set as in Fig. 1 for straight line guiding or advancement of the vehicle, the steering wheel 64 will be disposed so as to place and retain the control valve 22 in neutral or mid-position as shown in Fig. 2. The main pump 16 which is being constantly operated by the propelling motor of the vehicle, will then withdraw liquid from the reservoir 18 through the suction conduit 17, and will return the liquid to the supply reservoir through the discharge conduit 19, port 41, passages 40 and valve bore 39, without subjecting the manually operable pump 23 to pressure.

If the steering wheel 64 is shifted from neutral to cause the pins 55 thereon to coact with the slots 52 of the sleeve 51 so as to swing the lever 57 upwardly and raise the control valve 22, as shown in Fig. 3, then the passages 40 and bore 39 will be shut off, and the main pump discharge conduit 19 will be brought into communication with the hand pump conduit 32 through the valve port 41, 42, thereby causing the liquid under pressure to rotate the manual pump rotors 24, 25 in a direction opposite to that shown in Fig. 1. The liquid under pressure thus passing through the pump 23 besides assisting the operator in turning the steering wheel 64, will pass through the conduit 33 beyond the pump 23 and from thence through the ports 43, 45 and conduit 21 to the right displacement chamber of the cylinder 10. Simultaneously with this admission of liquid under pressure to the right side of the piston 13, the liquid at the left of this piston 13 will be free to escape through the conduit 20 and port 44 to the supply reservoir 18, thus causing the admitted liquid under pressure to move the piston 13 to the left within the cylinder 10 and effecting the desired steering movement of the wheels 12.

If, on the other hand, the steering wheel 64 is shifted from neutral position to cause the pins 55 thereon to coact with the slots 52 of the sleeve 51 so as to swing the lever 57 downwardly and thus lower the control valve 22, as shown in Fig. 4, then the passages 40 and bore 49 will again be shut off, and the main pump discharge conduit 19 will be brought into communication with the hand pump conduit 33 through the valve ports 41, 43, thereby causing the liquid under pressure to rotate the manual pump rotors 24, 25 in the direction indicated in Fig. 1. The liquid under pressure passing through the pump 23, besides assisting the operator in turning the steering wheel 64, in the desired direction, will pass through the conduit 32 beyond the pump 23 and from thence through the ports 42, 44 and conduit 20 to the left displacement chamber of the cylinder 10. Simultaneously with this admission of liquid under pressure to the left side of the piston 13, the liquid at the right of this piston 13 will be free to escape through the conduit 21 and port 45 directly to the supply reservoir 18, thus causing the admitted liquid under pressure to move the piston 13 to the right within the cylinder 10 and effecting the desired steering movement of the wheels 12.

When the steering wheel is operated to return the valve 22 to neutral or mid-position, after steering in either direction has been effected, the wheels 12 may be held in adjusted position by virtue of the fact that the liquid may then be held confined within the cylinder 10 and conduits 20, 21. Steering in either direction may however be quickly effected by properly manipulating the steering wheel 64, and while the operation of the pump 16 materially augments the ease with which steering may be performed, it is to be noted that if this pump 16 should fail in operation, steering may still be effected by manually and forcibly turning the hand wheel 64 in either direction. This is an extremely important feature of the present invention, since it assures possibility of steering even if the power pump 16 should become ineffective. When the servo-motor piston 13 reaches the end of its stroke while moving in either direction, the pressure in the discharge conduit 19 will rise and the relief valve 30 will then function to relieve the high pressure in the pump discharge conduit by permitting the admitted liquid to escape to the supply reservoir 18. The check valve 31 is provided for the purpose of permitting liquid to be withdrawn from the supply reservoir 18 into the auxiliary pump 23, either when the main pump 16 fails, or when the steering wheel 64 is operated to actuate the pump 23 faster than the pump 16 can feed liquid thereto; and the admission opening 47 is located at the highest point in the system so as to insure proper escape of all air from the system and through filling of all of the passages with liquid. In filling the system it is preferable to admit oil and to operate the steering wheel 64 in both directions at intervals, so as to permit the oil to displace air in the various displacement chambers and passages.

From the foregoing detailed description it will be apparent that my present invention provides an improved hydraulic steering system which is extremely simple and compact in construction, and which is moreover highly efficient in operation. The improved steering gear causes the controlled vehicle to positively and quickly partake directional advancements corresponding to the movements of the manually operated steering wheel 64, and slight movement of this wheel will cause slight steering movement of the wheels 12, whereas greater movement of the steering wheel 64 will cause correspondingly greater movement of the steering transporting wheels 12. The improved hydraulic steering assemblage is easily manipulable and sensitive in action, and while the assemblage is normally operable by power in conjunction with the manual control, the system will not fail to function in case the power fails. The hydraulic steering system constituting the present invention is compact and durable in construction and may be readily installed as a unit in vehicles of various types and especially in motor propelled vehicles in which the propelling motor of the vehicle may be utilized to drive the power pump 16. All parts of the improved structure are readily accessible for inspection, adjustment and other attention, and the apparatus may be safely operated by a novice. The system can be quickly refilled with liquid so as to avoid entrapment of air, and the supply reservoir is so located that it will insure an adequate supply of oil to all chambers and conduits at all times. As previously indicated, the improved system has proven highly successful in actual commercial use, and especially in conjunction with relatively heavy power driven road vehicles in which proper steering is ordinarily a difficult problem.

It should be understood that it is not desired to limit this invention to the exact details of construction or to the exact mode of use herein shown and described for various modifications within the scope of the claims may occur to persons skilled in the art.

I claim:

1. In a vehicle steering system, a manually operated steering member, a source of liquid under pressure, a rotary pump operable by said manually operated steering member, a hydraulic steering motor, a valve operable to connect said manually operable pump to said source so as to cause the liquid under pressure to assist in actuating said pump and to subsequently actuate said steering motor and mechanical connections between the manually operated steering member and valve for operating said valve.

2. In a vehicle steering system, a manually operated steering member, a liquid supply reservoir, a pump for converting liquid from said reservoir from low pressure to high pressure, a rotary pump operable by said manually operated steering member, a hydraulically operated steering motor, and a valve operable to admit liquid under pressure to said manually operable pump and to thereby assist in actuating the same and to subsequently deliver said liquid to said steering motor, said valve also serving to connect said steering motor with said reservoir and mechanical connections between the manually operated steering member and valve for operating said valve.

3. In a vehicle steering system, a power pump, a rotary auxiliary pump operable as a motor, a liquid operated steering motor, a valve, a steering member, mechanical connections between said steering member and valve for operating said valve to cause said power pump to deliver liquid under pressure to said steering motor through said auxiliary pump, and means including connections between said auxiliary pump and valve whereby said steering member operates said auxiliary pump after it causes operation of said valve.

4. In a vehicle steering system, a source of liquid under pressure, a manually operable hydraulic rotary pump, a hydraulic steering motor, a valve movable from a neutral position to positions to connect said manually operable pump to said source to cause liquid under pressure to assist in actuating said manually operable pump and to subsequently operate said steering motor in a selected direction, and means included in said valve for hydraulically locking said manually operable pump prior to movement of said valve from neutral position.

5. In a vehicle steering system, a source of liquid under pressure, a manually operated steering member, a hydraulic rotary pump operable by said manually operated steering member, a hydraulic steering motor, a valve movable from a neutral position to positions to connect said steering member operated pump to said source so as to cause liquid under pressure to assist in actuating said steering member operated pump and to subsequently operate said steering motor in a selected direction, means included in said valve for hydraulically locking said manually operable pump prior to movement of said valve from neutral position, and mechanical connections between said manually operated steering member and valve for operating said valve.

6. In a vehicle steering system, a manually operated steering member, a liquid supply reservoir, a valve operable mechanically by said steering member, a rotary pump operable by said steering member, and a hydraulic steering motor operable by liquid under pressure delivered by said pump past said valve.

7. In a vehicle steering system, a manually operated steering member, a liquid supply reservoir, a valve operable mechanically by said steering member, a rotary pump operable by said steering member, after said valve is operated, and a hydraulic steering motor operable by liquid under pressure delivered by said pump past said valve.

8. In a vehicle steering system, a manually operable steering member, a liquid supply reservoir, a valve operable mechanically by said steering member, a rotary pump operable by said steering member, a power driven pump for augmenting the pressure of the liquid delivered from said reservoir to said first mentioned pump, and a hydraulic motor operable by liquid under pressure delivered by said two pumps past said valve or by said steering wheel operated pump alone.

9. In a vehicle steering system, a manually operable steering member, a liquid reservoir, a power driven pump, a control valve operable mechanically by said steering member, a rotary pump operable by said steering member after said valve is operated, and a hydraulic steering motor operable either by liquid under pressure from said power driven pump delivered through said steering wheel operated pump and valve or by said steering wheel operated pump independently of the power pump in case of failure of the latter.

10. In a vehicle steering system, a manually operable steering member having a rotatable shaft, a rotary pump operable by said steering member, a source of liquid under pressure, a hydraulic steering motor, a valve operable to connect said pump to said source so as to cause liquid under pressure to assist in actuating said pump and to subsequently actuate said steering motor, a lever coacting with said valve for actuating the latter, and means cooperable with said rotatable shaft of the steering member for moving said lever when the shaft is rotated.

11. In a vehicle steering system, a manually operable steering member having a rotatable shaft, a pump operable by said steering member, a source of liquid under pressure, a hydraulic steering motor, a valve operable to connect said pump to said source so as to cause liquid under pressure to assist in actuating said pump and to subsequently actuate said steering motor, a pivotally mounted lever coacting with said valve for actuating the latter, a sleeve loosely surrounding the steering shaft and engaging said lever, and means responsive to turning movement of the steering shaft for moving said sleeve longitudinally thereof to actuate said valve actuating lever.

12. In a vehicle steering system, a manually operable steering member having a rotatable shaft, a pump operable by said steering member, a source of liquid under pressure, a hydraulic steering motor, a valve operable to connect said pump to said source so as to cause liquid under pressure to assist in actuating said pump and to subsequently actuate said steering motor, a pivotally mounted lever coacting with said valve for actuating the latter, a sleeve loosely surrounding the steering shaft and engaging said lever, and a pin and slot connection between the sleeve and shaft responsive to turning movement of the shaft to move the sleeve longitudinally thereof and cause movement of the valve actuating lever.

13. In a vehicle steering system, a manually operable steering member having a rotatable shaft, a pump operable by said steering member and having a drive shaft alined with said steering member shaft, a source of liquid under pressure, a hydraulic steering motor, a valve operable to connect said pump to said source so as to cause liquid under pressure to assist in actuating said pump and to subsequently actuate said steering motor, a pivotally mounted lever coacting with said valve for actuating the latter, a sleeve loosely surrounding said steering member shaft and engaging said lever and having a splined connection with the pump drive shaft, and means responsive to turning movement of the steering member shaft for moving said sleeve longitudinally thereof to move said valve actuating lever.

14. In a vehicle steering system, a manually operable steering member having a rotatable shaft, a pump operable by said steering member and having a drive shaft alined with said steering member shaft, a source of liquid under pressure, a hydraulic steering motor, a valve operable to connect said pump to said source so as to cause liquid under pressure to assist in actuating said pump and to subsequently actuate said steering motor, a pivotally mounted lever coacting with said valve for actuating the latter, a sleeve loosely surrounding said steering member shaft and engaging said lever and having a splined connection with the pump drive shaft, and means responsive to turning movement of the steering member shaft for moving said sleeve longitudinally thereof to move said valve actuating lever, the connections between said pump and valve being constructed to hydraulically lock the pump prior to operation of said valve to prevent rotation of said sleeve during valve actuation.

15. In a vehicle steering system, a manually operable steering member having a rotatable shaft, a pump operable by said steering member, a reservoir for oil, a power driven pump for supplying oil under pressure from said reservoir, a hydraulic steering motor, a valve operable to connect said steering member operated pump to said reservoir to cause oil under pressure from the power driven pump to assist in operating said steering member operated pump and to subsequently operate said steering motor, a pivotally mounted lever coacting with said valve for actuating the latter, and means cooperable with said rotatable shaft of the steering member for moving said lever when the shaft is rotated, said means and lever being located within said oil reservoir to be lubricated by oil therein.

16. In a vehicle steering system, a manually operable steering member having a rotatable shaft, a pump operable by said steering member, a reservoir for oil, a power driven pump for supplying oil under pressure from said reservoir, a hydraulic steering motor, a valve operable to connect said steering member operated pump to said reservoir to cause oil under pressure from the power driven pump to assist in operating said steering member operated pump and to subsequently operate said steering motor, a pivotally mounted lever coacting with said valve for actuating the latter, a sleeve loosely surrounding the steering member shaft and engaging said lever, and means responsive to turning movement of the steering member shaft for moving said sleeve longitudinally thereof to move said valve actuating lever, said lever and sleeve being located within said oil reservoir to be lubricated by oil therein.

17. In a vehicle steering system, a steering member having a rotatable shaft, a pump, a liquid supply reservoir including a housing having a bottom wall formed with a bearing through which said steering shaft is journalled, said pump being located below said bottom wall of the reservoir and being driven by said shaft, and a hydraulic steering motor operable by liquid delivered under pressure by said pump.

18. In a vehicle steering system, a steering member having a rotatable shaft, a pump, a liquid supply reservoir including a housing having a bottom wall formed with a bearing through which said steering shaft is journalled, said pump being located below said bottom wall of the reservoir and being driven by said shaft, a valve operable by said steering member, a hydraulic motor operable by liquid under pressure delivered by said pump past said valve, and a power driven pump for augmenting the pressure of the liquid delivered from said reservoir through said valve to the steering member operated pump.

19. In a vehicle steering system, a steering member having a rotatable steering column comprising a manually operable upper section and a lower section, a hydraulic pump operable by the lower steering column section, hydraulic steering motor means, a valve operable to hydraulically connect said pump to said steering motor means to cause liquid under pressure from said pump to actuate said steering motor means in a selected direction, a connection between the upper steering column section and the lower section whereby the upper steering column section has limited rotation in both directions while the lower section is maintained against rotation by the resistance imposed by said steering column operated pump, and means between said upper steering column section and said valve to actuate the latter during said limited independent rotation of the upper steering column section.

20. In a vehicle steering system, a steering member having a rotatable steering column comprising a manually operable upper section and a lower section, a hydraulic power driven pump, hydraulic steering motor means, a valve operable to hydraulically connect said pump to said steering motor means to cause liquid under pressure from said pump to operate said steering motor means in a selected direction, means including a connection between the upper steering column section and the lower section whereby the upper steering column section has limited rotation in both directions prior to rotation of the lower section, means between said upper steering column section and said valve operable to actuate the latter during said limited independent rotation of the upper steering column section, and a second hydraulic pump hydraulically connected with the hydraulic steering motor means and actuated by rotation of the lower steering column section.

21. In a vehicle steering system, a manually operable steering member having a rotatable shaft, a pump operable by said steering member, a source of liquid under pressure, a hydraulic steering motor, a valve operable to connect said pump to said source so as to cause liquid under pressure to assist in actuating said pump and to subsequently actuate said steering motor, a valve actuating member coacting with said valve for actuating the latter, a sleeve loosely surrounding the steering shaft and engaging said valve actuating member, and means responsive to turning movement of the steering shaft for moving said sleeve longitudinally thereof to actuate said valve actuating member.

22. In a vehicle steering system, a manually operable steering member having a rotatable shaft, a pump operable by said steering member, a source of liquid under pressure, a hydraulic steering motor, a valve operable to connect said pump to said source so as to cause liquid under pressure to assist in actuating said pump and to subsequently actuate said steering motor, a valve actuating member co-acting with said valve for actuating the latter, a sleeve loosely surrounding the steering shaft and engaging said valve actuating member, and a pin and slot connection between the sleeve and shaft responsive to turning movement of the shaft to move the sleeve longitudinally thereof and cause movement of the valve actuating member.

23. In a vehicle steering system, a manually operable steering member having a rotatable shaft, a pump operable by said steering member and having a drive shaft alined with said steering member shaft, a source of liquid under pressure, a hydraulic steering motor, a valve operable to connect said pump to said source so as to cause liquid under pressure to assist in actuating said pump and to subsequently actuate said steering motor, a valve actuating member coacting with said valve for actuating the latter, a sleeve loosely surrounding said steering member shaft and engaging said valve actuating member and having a splined connection with the pump drive shaft, and means responsive to turning movement of the steering member shaft for moving said sleeve longitudinally thereof to move said valve actuating member.

24. In a vehicle steering system, a manually operable steering member having a rotatable shaft, a pump operable by said steering member and having a drive shaft alined with said steering member shaft, a source of liquid under pressure, a hydraulic steering motor, a valve operable to connect said pump to said source so as to cause liquid under pressure to assist in actuating said pump and to subsequently actuate said steering motor, a valve actuating member coacting with said valve for actuating the latter, a sleeve loosely surrounding said steering member shaft and engaging said valve actuating member and having a splined connection with the pump drive shaft, and means responsive to turning movement of the steering member shaft for moving said sleeve longitudinally thereof to move said valve actuating member, the connections between said pump and valve being constructed to hydraulically lock the pump prior to operation of said valve to prevent rotation of said sleeve during valve actuation.

25. In a vehicle steering system, a manually operable steering member having a rotatable shaft, a pump operable by said steering member, a reservoir for oil, a power driven pump for supplying oil under pressure from said reservoir, a hydraulic steering motor, a valve operable to connect said steering member operated pump to said reservoir to cause oil under pressure from the power driven pump to assist in operating said steering member operated pump and to subsequently operate said steering motor, a valve actuating member coacting with said valve for actuating the latter, and means cooperable with said rotatable shaft of the steering member for moving said valve actuating member when the shaft is rotated, said means and member being located within said oil reservoir to be lubricated by oil therein.

26. In a vehicle steering system, a manually operable steering member having a rotatable shaft, a pump operable by said steering member, a reservoir for oil, a power driven pump for supplying oil under pressure from said reservoir, a hydraulic steering motor, a valve operable to connect said steering member operated pump to said reservoir to cause oil under pressure from the power driven pump to assist in operating said steering member operated pump and to subsequently operate said steering motor, a valve actuating member coacting with said valve for actuating the latter, a sleeve loosely surrounding the steering member shaft and engaging said valve actuating member, and means responsive to turning movement of the steering member shaft for moving said sleeve longitudinally thereof to move said valve actuating member, said member and sleeve being located within said oil reservoir to be lubricated by oil therein.

HENRY C. FRENCH.